United States Patent

Urban

[15] 3,644,087

[45] Feb. 22, 1972

[54] PROCESS FOR SCRUBBING SULFUR DIOXIDE FROM A GAS STREAM

[72] Inventor: Peter Urban, Northbrook, Ill.

[73] Assignee: Universal Oil Products Company, Des Plaines, Ill.

[22] Filed: Feb. 9, 1970

[21] Appl. No.: 9,968

[52] U.S. Cl. ..............................................23/2 SQ, 23/115
[51] Int. Cl. ......................................................C01b 17/64
[58] Field of Search...................23/2 SQ, 224, 225, 115, 178

[56] References Cited

UNITED STATES PATENTS

| 3,523,755 | 8/1970 | McRae.....................................23/2 X |
| 1,570,253 | 1/1926 | Howard...................................23/115 |
| 1,760,137 | 5/1930 | Howard...............................23/225 X |
| 2,763,531 | 9/1956 | Levenson...............................23/115 |
| 2,315,534 | 4/1943 | Marasco.............................23/115 X |
| 2,863,732 | 12/1958 | Bowers et al. ...........................23/224 |

FOREIGN PATENTS OR APPLICATIONS 10,147   4/1913   Great Britain........................23/225 F Primary Examiner—Oscar R. Vertiz
Assistant Examiner—G. O. Peters
Attorney—James R. Hoatson, Jr. and Thomas K. McBride

[57] ABSTRACT

A process for the removal of $SO_2$ from a gas stream containing $SO_2$ and $O_2$ wherein the use of a conventional scrubbing solution containing an alkaline reagent results in the formation of undesired, intractable sulfate byproducts, is improved by adding to the scrubbing zone a reducing agent selected from the group consisting of finely divided sulfur, a polysulfide compound, a water-soluble sulfide compound and mixtures thereof, and by thereafter operating the scrubbing zone under thiosulfate-production conditions, thereby suppressing the production of undesired sulfate byproducts. Principal utility of this improved process is associated with a process for scrubbing $SO_2$ from a flue or stack gas stream. Key feature of this improved process involves the selective conversion of the absorbed $SO_2$ to the corresponding thiosulfate compound within the scrubbing zone, thereby minimizing the opportunity for the oxygen contained in the gas stream to oxidize the sulfite salt to the undesired sulfate byproducts.

13 Claims, No Drawings

PROCESS FOR SCRUBBING SULFUR DIOXIDE FROM A GAS STREAM

The subject of the present invention is an improvement in a process for scrubbing $SO_2$ from a gas stream containing $SO_2$ and $O_2$, in which process the scrubbing solution is a conventional solution containing an alkaline reagent. The improvement involves a method for the suppression of undesired sulfate byproducts of the scrubbing step. This suppression is accomplished by introducing into the scrubbing zone a sufficient quantity of a reducing agent which is effective to convert the absorbed sulfur dioxide into the corresponding thiosulfate compound as it is formed. This conversion of the absorbed $SO_2$ to the corresponding thiosulfate compound acts to restrict the opportunity for the oxygen contained in the gas stream to oxidize the absorbed $SO_2$ (i.e., typically present as a water-soluble sulfite compound) to the undesired sulfate byproducts. In one important aspect, the present invention involves an improvement in a process for scrubbing $SO_2$ from a gas stream containing $SO_2$ and $O_2$ where the scrubbing solution is an aqueous solution of ammonium hydroxide or ammonium carbonate and where ammonium sulfate is an undesired byproduct of the scrubbing step. The improvement of the present invention in this case involves the addition of a reducing agent such as ammonium hydrosulfide to the scrubbing zone in an amount selected to reduce the absorbed sulfur dioxide to ammonium thiosulfate. This in situ conversion of the absorbed sulfur oxide to ammonium thiosulfate acts to limit the opportunity for the oxygen contained in the gas stream to oxidize the sulfur dioxide to the undesired, refractory ammonium sulfate byproduct.

A major problem encountered in many areas of industry today is associated with the production of waste gas streams containing sulfur dioxide. The problem essentially involves the disposal of these waste gas streams without causing substantial air pollution. This problem is an extremely complex one because of the wide variety of industrial sources that emit these sulfur dioxide-containing gas streams. One of the more common sources is associated with the combustion of sulfur-containing fuels in boilers, internal combustion engines, heating units, etc., to produce flue or stack gas streams containing sulfur dioxide. Similarly, waste gas streams of this type are generally produced by other industrial processes such as the smelting of sulfur-bearing ores, the refining of sulfur-containing crude oils, the synthesis of sulfuric acid, the sulfonation of hydrocarbons, the production of coke, the production of sulfur in a Claus process, the production of paper via a wood-pulping process, and the like industrial processes. It is well known that the indiscriminate discharge of these gas streams into the atmosphere results in a substantial air pollution problem because the sulfur dioxide has extremely detrimental effects on animal and plant life. In addition, the discharge of these gas streams into the atmosphere constitutes a waste of a valuable material because the sulfur contained in same is an industrial commodity. Many processes have been proposed for removal of sulfur dioxide from these gas streams. A large percentage of these proposed removal procedures involve contacting the sulfur dioxide-containing gas stream with an aqueous absorbent stream which typically contain materials which chemically or physically react with the sulfur dioxide in order to absorb same into the liquid solution. A common procedure involves the use of a solution of an alkaline reagent, such as the hydroxide and carbonate compounds of ammonia, the alkali metals, and the alkaline earth metals, to produce a rich absorbent stream containing the corresponding sulfite compound.

Although the simple concept of scrubbing $SO_2$ from a gas stream containing same with a scrubbing solution containing an alkaline reagent has many advantages associated with it such as simplicity, versatility, effectiveness, and the like, widespread adoption of this approach to the solution of the $SO_2$ scrubbing problem has been inhibited by the fact that the gas streams which are typically treated for removal of $SO_2$ also contain significant quantities of oxygen. When a gas stream containing both $SO_2$ and $O_2$ is scrubbed by an aqueous solution of an alkaline reagent, the formation of sulfate compounds as one of the byproducts of the scrubbing step is inevitably observed. These sulfate byproducts are very intractable and present a significant barrier to the use of these conventional scrubbing procedures, particularly where the scrubbing step is coupled with a regeneration step in a closed system wherein the scrubbing solution is continuously being recirculated. These sulfate byproducts in a closed system tend to build up in the recycle water stream until finely divided solids are formed. These sulfate solids then can collect in the form of a scale or sludge which can foul the internals of the equipment used in the scrubbing step and in the regeneration step of the closed scrubbing system. Moreover, they can cause severe corrosion and erosion problems in the scrubbing equipment.

The formation of these sulfate byproducts is attributed to the interaction of the oxygen contained in the input gas stream with the water-soluble sulfite compound that is formed when the $SO_2$ is absorbed in the scrubbing solution. Hence there is a need for a method for suppressing this oxidation side reaction during the course of the scrubbing step.

The problem addressed by the present invention, is therefore, to provide an improved solution to the problem of suppressing the formation of undesired sulfate byproducts during the course of a scrubbing operation which uses a conventional scrubbing solution comprising an alkaline reagent in water.

I have now found a procedure which effectively suppresses the formation of these sulfate byproducts without interfering with the mechanics of the absorption step. The concept of the present invention is based on my finding that the water-soluble sulfite compound that is formed by the reaction of the alkaline reagent with $SO_2$ in the scrubbing step can be easily and quickly converted by a suitable reducing agent during the course of the scrubbing step to the corresponding thiosulfate compound which has a very small propensity to oxidize to the corresponding sulfate compound. Thus, the central feature of the present invention involves introducing sufficient reducing agent into the scrubbing step in order to enable the in situ formation of the corresponding thiosulfate compound, thereby minimizing the opportunity for the oxygen contained in the gas stream to oxidize the water-soluble sulfite compound to the undesired sulfate byproduct. Another feature of the instant invention is that the reducing agent is selected from the group consisting of finely divided sulfur, a polysulfide compound, a water-soluble sulfide compound and mixtures thereof. The resulting thiosulfate-containing stream withdrawn from the scrubbing step can then be regenerated by any suitable procedure known to the art for treating a water stream to remove thiosulfate compounds therefrom such as a reduction procedure involving the use of a reducing agent such as hydrogen, carbon monoxide or hydrogen sulfide to reduce the thiosulfate to elemental sulfur or hydrogen sulfide.

It is, accordingly, an object of the present invention to provide a simple, effective and economic method for suppressing the formation of undesired sulfate byproducts during the course of a scrubbing step in which sulfur dioxide is removed from a gas stream containing $SO_2$ and $O_2$ by scrubbing with an aqueous scrubbing solution containing an alkaline reagent.

In brief summary, the present invention is in one embodiment, an improvement in a process for the removal of $SO_2$ from a gas stream containing $SO_2$ and $O_2$. In this process the gas stream is contacted, in a gas-liquid scrubbing zone, with an aqueous scrubbing solution containing an alkaline reagent at scrubbing conditions selected to form a treated gas stream and a rich scrubbing solution containing a water-soluble sulfate compound. During the course of this scrubbing step the oxygen present in the gas stream reacts with the resulting sulfite compounds to form undesired intractable sulfate byproducts. Against this background, the improvement of the present invention involves: adding to the scrubbing zone a reducing agent selected from the group consisting of finely divided sulfur, a polysulfide compound, a water-soluble sulfide compound and mixtures thereof; and thereafter, operating the scrubbing zone under thiosulfate production conditions selected to react the reducing agent with the water-soluble sulfite compound as it is formed to produce the corresponding thiosulfate compound, thereby suppressing the production of undesired sulfate byproducts.

Other objects and embodiments of the present invention are hereinafter disclosed in the following discussion of the input streams, the preferred conditions, the output streams, the preferred reactants and mechanics associated with the essential and preferred steps of the present invention.

As indicated above, the present invention is concerned with a scrubbing step wherein a gas stream containing $SO_2$ and $O_2$ is contacted with a scrubbing solution containing an alkaline reagent. The input gas stream passed to this step is typically a flue or stack gas. For example, a typical stack gas stream contains: about 1 to 10% $O_2$, about 5 to 15% or more $CO_2$, about 3 to 10% or more $H_2O$, about 0.05 to 1% or more $SO_2$ and $N_2$. In some cases, the input gas stream also contains carbon monoxide and oxides of nitrogen. On the other hand, the scrubbing solution is generally characterized as an aqueous solution of a suitable alkaline reagent such as ammonium hydroxide, ammonium carbonate, the alkali metal hydroxides, the alkali metal carbonates, the water-soluble alkaline earth hydroxides and carbonates and the like alkaline reagents. Of the alkali metal reagents, sodium hydroxide, sodium carbonate, potassium hydroxide and potassium carbonate are particularly preferred. In most cases, excellent results are obtained when the alkaline reagent is ammonium hydroxide or ammonium carbonate. It is to be noted that the scope of the present invention includes the use of mixtures of the alkaline reagents previously mentioned. In addition, it includes the use of the bicarbonate salt or mixtures of the bicarbonate and normal salts of ammonia, the alkali metal and the alkaline earth metals. In general, acceptable results are obtained with an aqueous scrubbing solution containing about 1 to about 15 wt. percent of the alkaline reagent, although solutions containing an amount of the alkaline reagent up to the solubility limit of the particular alkaline reagent at the conditions maintained in the scrubbing step can in many cases be used.

This scrubbing step can be carried out in a conventional scrubbing zone in any suitable manner including multiple stages. The scrubbing solution can be passed into the scrubbing zone in either upward or downward flow and the input gas stream can be simultaneously introduced into the scrubbing zone in concurrent flow relative to the scrubbing solution. A particularly preferred procedure involves downward flow of the scrubbing solution with countercurrent flow of the gas stream which is to be treated. The scrubbing zone is preferably a conventional gas-liquid contacting zone containing suitable means for effecting intimate contact between a descending liquid stream and an ascending gas stream. Suitable contacting means include bubble trays, baffles, and any of the various packing materials known to those skilled in the art. In this countercurrent mode of operation, a treated gas stream is withdrawn from the upper region of the scrubbing zone and a rich scrubbing solution is withdrawn from the lower region thereof. For the class of alkaline reagents of concern here, the rich scrubbing solution will contain a water-soluble sulfite compound such as ammonium sulfite and/or bisulfite, sodium sulfite and/or bisulfite and the like. As was previously indicated this rich scrubbing solution will contain undesired sulfate byproducts such as ammonium sulfate, sodium sulfate and the like compound, if the improvement of the present invention is not employed.

This scrubbing step is generally conducted under conventional scrubbing conditions which are selected on the basis of the characteristics of the specific alkaline reagent utilized, the sulfur dioxide content of the input gas stream, the portion of the sulfur dioxide that is to be removed in the scrubbing step, and the physical properties of the scrubbing zone. Ordinarily, the scrubbing step is operated at a relatively low temperature of about 10° to 75° C., a relatively low pressure which typically approximates atmospheric, and a volume ratio of input gas streams to scrubbing solution of about 100:1 to about 10,000:1. When the input gas stream is a flue or stack gas stream, means must ordinarily be provided for cooling the input gas stream to a relatively low temperature before it is introduced into the scrubbing step. Likewise, since the typical operation of the scrubbing step involves the handling of large volumes of gas containing only a relatively small amount of sulfur dioxide, it is preferred that the pressure drop through the scrubbing zone be held to a minimum so as to avoid the necessity of compressing large volumes of gas to overcome the pressure drop within the scrubbing zone.

In accordance with the present invention, the operation of the scrubbing step described above is modified by the introduction into the scrubbing zone of a reducing agent selected from the group consisting of finely divided sulfur, a polysulfide compound, a water-soluble sulfide compound and mixtures thereof. In one mode of operation of the improved scrubbing step, finely divided sulfur is utilized as the reducing agent, and it is preferred that the sulfur be present in particle size of about 10 to about 250 microns, with best results obtained with particles of about 25 to about 100 microns. Typically, it is a good practice to introduce the sulfur into the scrubbing step via a water stream containing a slurry of finely divided sulfur in an amount of about 1 to about 75 wt. percent thereof, although any other suitable means for injecting finely divided solid particles can be utilized if desired. One preferred procedure involves the addition of the required sulfur to the scrubbing solution before it enters the scrubbing zone. In this first mode of operation, it is preferred to also introduce a wetting agent into the scrubbing zone in order to facilitate good contact of the elemental sulfur with the sulfite compound. Suitable wetting agents are: the salts of the alkyl aryl sulfonates such as the sodium salt of dodecylbenzene sulfonate; sulfonated fatty acid esters; $C_{12}$ to $C_{16}$ alkyl sulfates; $C_{12}$ to $C_{16}$ alkyl sulfonates; alkyl polyoxyethylene alcohols; ethylene oxide condensations products of alkyl phenols; quaternary ammonium salts such as octadecyldimethylbenzyl ammonium chloride and the like wetting agents. The wetting agent is preferably utilized in a relatively small amount corresponding to about 0.01 to about 1 wt. percent of the sulfite compound that is reacted. The amount of elemental sulfur utilized in this first mode of operation of the improved scrubbing step should be sufficient to at least supply one atom of sulfur per molecule of the absorbed $SO_2$, with the preferred amount corresponding to about 1 to about 3 atoms of sulfur per mole of absorbed $SO_2$.

In a second mode of operation of this improved scrubbing step, the reducing agent is a polysulfide compound. Suitable polysulfide compounds include the ammonium, alkali metal, and alkaline earth polysulfides. Best results are ordinarily obtained with ammonium polysulfide. The polysulfide compound is ordinarily charged to the scrubbing step in the form of an aqueous solution containing about 1 to about 50 wt. percent of the polysulfide compound. In fact, a preferred procedure involves the addition of the polysulfide compound to the scrubbing solution before it enters the scrubbing zone. It is to be noted that when the reducing agent is a polysulfide compound, no wetting agent is necessary in order to achieve good contact with the sulfite compound. The amount of the polysulfide compound charged to the improved scrubbing step in this mode of operation is preferably sufficient to provide at least the stoichiometric amount necessary for the reaction between it and the absorbed $SO_2$ to produce the corresponding thiosulfate compound. In the typical case where the polysulfide compound contains four atoms of elemental sulfur and one atom of sulfide e.g., $(NH_4)_2S_5$, the stoichiometric amount is 1/6 moles of polysulfide per mole of absorbed $SO_2$, with a preferred value being about ¼ to about ¾ or more moles of polysulfide per mole of absorbed $SO_2$.

In a third mode of operation of this improved scrubbing step, the reducing agent is a water-soluble sulfide compound. Suitable water-soluble sulfide compounds are hydrogen sulfide, ammonium sulfide, ammonium hydrosulfide and the sulfides and hydrosulfides salts of the alkali and alkaline earth metals. This water-soluble sulfide compound is preferably introduced into the scrubbing zone by adding it to the scrubbing solution before it enters the zone. Best results are ordinarily obtained in this last mode of operation of this step when the sulfide reactant is hydrogen sulfide or ammonium hydrosulfide. The amount of this sulfide reactant charged to the scrubbing step in this mode of operation is at least sufficient to provide 0.5 moles of sulfide compound per mole of absorbed $SO_2$, with best results obtained at a mole ratio corresponding to about 0.6 to about 1.5 or more. Likewise, in this third mode of operation, best results are ordinarily obtained when the pH of the scrubbing solution is in the range of 4 to about 7 when it enters the scrubbing zone.

Conditions utilized in this improved scrubbing step are generally described as thiosulfate-production conditions and comprise a temperature of about 5° to about 150° C., a pressure sufficient to maintain the scrubbing solution in the liquid phase and a contact time corresponding to about 0.05 to 1 or more hours. In general, the contact time necessary for the desired reaction is a function of the reducing agent utilized, with relatively short contact times of about 1 to 5 minutes being sufficient in the case where the reducing agent is a polysulfide compound. The other two reducing agents require a relatively longer contact time ranging up to about 0.5 to about 1 hour. Considering all of the factors involved in the operation of this improved scrubbing step, best results are ordinarily obtained when the reducing agent is a polysulfide compound, and particularly ammonium polysulfide, or a sulfide compound such as ammonium hydrosulfide.

Following this improved scrubbing step, a rich scrubbing solution is withdrawn therefrom and found to contain relatively large amounts of the corresponding thiosulfate compound, minor amounts of unreacted sulfite compounds and of the corresponding polythionates and particularly the dithionate, with only a trace amount of undesired, intractable sulfate byproducts. Both the thiosulfate compound and the polythionate compounds are easily reduced by suitable reducing agents such as hydrogen, carbon monoxide or water-soluble sulfide compound to allow the recovery of elemental sulfur or hydrogen sulfide and the regeneration of the scrubbing solution. In sharp contrast, the liquid effluent stream withdrawn from the scrubbing step when it is operated without the benefit of the present invention contains significant amounts of undesired intractable sulfate compound which are extremely difficult to reduce with the above-mentioned conventional reducing agents. It is to be noted that the details associated with the regeneration step are not essential to the acquisition of the improved operation of the scrubbing step and consequently are not discussed here.

The following Example is represented to demonstrate the significant contribution associated with the improvement of the present invention. The example is, of course, intended to be illustrative rather than restrictive.

EXAMPLE

This example illustrates the benefits associated with the present invention by contacting the results obtained with and without it in the scrubbing of a typical flue gas stream.

Two cases are considered: Case A, the control run, involves scrubbing with an aqueous scrubbing solution containing 5.2 wt. percent ammonium carbonate; Case B, the present invention, involves scrubbing with an aqueous scrubbing solution containing not only 5.2 wt. percent ammonium carbonate but also 4 wt. percent ammonium hydrosulfide.

In both cases, the scrubbing zone is a conventional gas-liquid contacting zone fitted with convention means for effective intimate contact between an ascending gas stream and a descending liquid stream. Likewise, in both cases the flue gas stream contains 5% $O_2$, 12% $CO_2$, 6% $H_2O$, 76.8% $N_2$, and 0.2% $SO_2$.

The conditions utilized in he scrubbing zone in both cases are: a temperature of 55° C., a pressure of about atmospheric, and a gas-to-scrubbing-liquid volume ratio of about 700:1. In addition, in both cases, the pH of the scrubbing liquid entering the scrubbing zone is maintained within the range of 5.5–6.5.

In the first case, Case A, after the scrubbing zone has been started-up and lined-out, an analysis of the rich scrubbing solution leaving the scrubbing zone indicates that for every 100 moles of sulfur dioxide that are absorbed by the solution, 70 moles are converted to ammonium sulfite and bisulfite and 30 moles are converted to undesired ammonium sulfate.

In the case where the method of the present invention is used, Case B, a similar analysis of the rich scrubbing solution leaving the scrubbing zone shows that for every 100 moles of sulfur dioxide absorbed by the modified scrubbing solution, 80 moles are converted to ammonium thiosulfate, 10 moles are converted to ammonium sulfite, 7 moles are converted to ammonium dithionate and about 3 moles are converted to the undesired ammonium sulfate. Since the ammonium dithionate (i.e., $(NH_4)_2S_2O_6$) is easily reduced, its presence presents no insurmountable difficulty, especially as compared to the presence of ammonium sulfate, in the subsequent regeneration of the rich scrubbing solution.

It is, therefore, clear that the principal effect of the present invention is to enable a rather sharp and substantial reduction in the amount of undesired, intractable ammonium sulfate formed during the scrubbing step. Specifically, the amount of this undesired byproduct was decreased by a factor of about 10 by the instant invention.

It is intended to cover by the following claims all changes and modifications of the above disclosure of the present invention that would be self-evident to a man of ordinary skill in the flue gas-treating art.

I claim as my invention:

1. In a process for the removal of $SO_2$ from a gas stream containing $SO_2$ and $O_2$, wherein the gas stream is contacted, in a gas-liquid scrubbing zone, with an aqueous scrubbing solution containing an alkaline reagent at scrubbing conditions selected to form a treated gas stream and a rich scrubbing solution containing a water-soluble sulfite compound and wherein the oxygen present in the gas stream reacts with the resulting sulfite compound to form an undesired, intractable sulfate byproduct, the improvement comprising: adding to the scrubbing zone a reducing agent selected from the group consisting of finely divided sulfur, a polysulfide compound, a water-soluble sulfide compound and mixtures thereof; and thereafter, operating the scrubbing zone under thiosulfate-production conditions selected to react the reducing agent with the water-soluble sulfite compound as it is formed to produce the corresponding thiosulfate compound, thereby suppressing the production of undesired sulfate byproducts.

2. An improved process as defined in claim 1 wherein the alkaline reagent is ammonium carbonate.

3. An improved process as defined in claim 1 wherein the alkaline reagent is ammonium hydroxide.

4. An improved process as defined in claim 1 wherein the alkaline reagent is sodium hydroxide.

5. An improved process as defined in claim 1 wherein the alkaline reagent is sodium carbonate.

6. An improved process as defined in claim 1 wherein the thiosulfate-production conditions include a temperature of about 5° to about 150° C. and a pressure sufficient to maintain the scrubbing solution in the liquid phase.

7. An improved process as defined in claim 1 wherein the reducing agent is finely divided sulfur which is used in amounts sufficient to at least provide a mole ratio of sulfur to the absorbed $SO_2$ of 1:1.

8. An improved process as defined in claim 7 wherein a wetting agent is also added to the contacting zone.

9. An improved process as defined in claim 8 wherein the wetting agent is a quaternary ammonium salt.

10. An improved process as defined in claim 1 wherein the reducing agent is a polysulfide compound which is used in an amount sufficient to at least provide a mole ratio of polysulfide to absorbed $SO_2$ of 1:6.

11. An improved process as defined in claim 1 wherein the reducing agent is a water-soluble sulfide compound which is used in an amount at least sufficient to provide a mole ratio of sulfide to absorbed $SO_2$ of 1:2.

12. An improved process as defined in claim 11 wherein the reducing agent is hydrogen sulfide.

13. An improved process as defined in claim 11 wherein the reducing agent is ammonium hydrosulfide.

* * * * *